United States Patent
Brown

(10) Patent No.: US 11,033,365 B2
(45) Date of Patent: Jun. 15, 2021

(54) DENTAL IMPLANT SYSTEM

(71) Applicant: Alan Brown, Gastonia, NC (US)

(72) Inventor: Alan Brown, Gastonia, NC (US)

( * ) Notice: Subject to any disclaimer, the term of this patent is extended or adjusted under 35 U.S.C. 154(b) by 342 days.

(21) Appl. No.: 15/899,115

(22) Filed: Feb. 19, 2018

(65) Prior Publication Data

US 2018/0271626 A1 Sep. 27, 2018

Related U.S. Application Data

(60) Provisional application No. 62/474,711, filed on Mar. 22, 2017.

(51) Int. Cl.
*A61C 8/00* (2006.01)

(52) U.S. Cl.
CPC .......... *A61C 8/0068* (2013.01); *A61C 8/0056* (2013.01); *A61C 8/0062* (2013.01); *A61C 8/0065* (2013.01); *A61C 8/0022* (2013.01); *A61C 8/0037* (2013.01)

(58) Field of Classification Search
CPC ... A61C 8/0068; A61C 8/0056; A61C 8/0062; A61C 8/0065; A61C 8/0022; A61C 8/0037
See application file for complete search history.

(56) References Cited

U.S. PATENT DOCUMENTS

| | | |
|---|---|---|
| 5,071,350 A | 12/1991 | Niznick |
| 5,564,921 A | 10/1996 | Marlin |
| 5,571,016 A | 11/1996 | Ingber et al. |
| 5,725,375 A | 3/1998 | Rogers |
| 5,733,124 A * | 3/1998 | Kwan ............ A61C 8/0001 433/173 |
| 5,810,589 A | 9/1998 | Michnick et al. |
| 5,816,809 A | 10/1998 | Sapkos |
| 5,823,777 A | 10/1998 | Misch et al. |
| 5,927,979 A | 7/1999 | Misch et al. |
| 6,068,480 A | 5/2000 | Misch et al. |
| 2008/0153059 A1 | 6/2008 | Schaffran et al. |
| 2008/0261174 A1 | 10/2008 | Gittleman |
| 2009/0123891 A1 | 5/2009 | Rosenberg |

(Continued)

FOREIGN PATENT DOCUMENTS

| | | |
|---|---|---|
| DE | 102006040516 A1 | 3/2008 |
| WO | WO 01/50977 A1 | 7/2001 |

OTHER PUBLICATIONS

Notification of Corresponding Application: Applicant owns International PCT Application No. PCT/US2018/018632, filed on Feb. 19, 2018, which discloses subject matter in common with the present application.

(Continued)

*Primary Examiner* — Heidi M Eide
*Assistant Examiner* — Drew S Folgmann
(74) *Attorney, Agent, or Firm* — Bryan W. Bockhop; Bockhop Intellectual Property Law, LLC

(57) ABSTRACT

A dental prosthesis securing system secures a dental prosthesis to a dental implant. An abutment for cement has a base surface for placement against the dental implant. The base surface does not define an engagement shape that requires alignment with a complementary shape defined by the implant. A securing mechanism secures the abutment for cement to the dental implant.

11 Claims, 4 Drawing Sheets

(56) References Cited

U.S. PATENT DOCUMENTS

| | | | |
|---|---|---|---|
| 2013/0004916 A1* | 1/2013 | Bellanca | A61C 8/0059 |
| | | | 433/173 |
| 2014/0205970 A1* | 7/2014 | Courvoisier | A61C 8/005 |
| | | | 433/174 |
| 2015/0104756 A1* | 4/2015 | Robb | A61C 8/0048 |
| | | | 433/201.1 |
| 2015/0132717 A1 | 5/2015 | Seo et al. | |
| 2016/0067016 A1 | 3/2016 | Hur | |

OTHER PUBLICATIONS

WIPO: "Notification of Transmittal of the International Search Report and the Written Opinion of the International Searching Authority, or the Declaration" Jun. 19, 2018, PCT Application No. PCT/US2018/018632.

EPO: "Supplementary Partial European Search Report"; dated Nov. 13, 2020 (EPO Search Report in related EP Application No. EP 18 77 0790).

\* cited by examiner

DENTAL IMPLANT SYSTEM

CROSS-REFERENCE TO RELATED APPLICATION(S)

This application claims the benefit of U.S. Provisional Patent Application Ser. No. 62/474,711, filed Mar. 22, 2017, the entirety of which is hereby incorporated herein by reference.

BACKGROUND OF THE INVENTION

1. Field of the Invention

The present invention relates to dental implants and, more specifically, to a dental implant system with a locking abutment.

2. Description of the Related Art

Roughly 125 million individuals in the United States alone are missing some of their teeth. One approach to treating patients missing teeth is to supply them with removable dentures. Dentures have the disadvantage of not adequately loading their supporting bone (such as the mandible for lower dentures and the maxilla for upper dentures). An unloaded supporting bone experiences very little strain. When the supporting bone lacks a minimum level of strain, bone resorption occurs. This results in shrinkage of the supporting bone and can further result in related health and aesthetic problems.

Another approach to treating edentulous or partially edentulous patients is to place endosteal osteointegrated (the integration of bone tissue with the implant) implants in the supporting bone. Osteointegrated endosteal implants are alloplastic materials surgically inserted into a residual bony ridge to serve as prosthodontic foundations. Such implants serve as platforms for prosthetic devices. The introduction of osteointegrated dental implants has given edentulous and partially edentulous patients a more effective means to restore their ability to chew and to improve their appearance. Furthermore, osteointegrated implants functionally load the mandibular (or maxillary) bone into which they are implanted, thereby inducing strain in the bone under normal functional loading. Bone loss and resorption, which commonly occur with dentures, can thereby be minimized or avoided by maintaining a proper loading profile on the bone.

Two subcategories of endosteal implants include plate form implants and root form implants. A plate form implant is characterized by a flat, narrow plate typically placed in a horizontal dimension of the mandibular or maxillary bone. Root form implants are designed to be placed in a vertical column of bone. Root form implants include two types: cylinder-type root form implants, which are non-threaded cylinders pressed into holes drilled into the receiving bone, and screw-type root form implants, having a threaded outer surface which is screwed into a hole drilled into the receiving bone.

A typical root form dental implant system employs a dental implant that is placed in a prepared site in the underlying bone. A disposable mount is used to provide a connection to an insertion tool used to place the implant into the bone. If the implant is a threaded implant, the mount is typically a removable extension of the implant that provides a hex nut-type surface for engagement with a socket used for screwing the implant into the prepared site. Once the implant is engaged in the site, the mount is removed and discarded. A cover screw is affixed to the top of the implant and the bone surrounding the prepared site is allowed to grow into the implant for several months, thereby securing the implant to the bone.

Once the surrounding bone has sufficiently engaged the implant, the cover screw is removed and an abutment is affixed to the implant. An impression of the implant with the abutment and the surrounding teeth is taken and a dental prosthesis, such as a crown, is constructed using the impression as a model of the area of the patient's mouth surrounding the implant site. The dental prosthesis is then affixed to the abutment with cement, or other affixing means. Thus, the abutment acts as a platform for securing a dental prosthesis to the implant.

Many current abutments have a bottom surface that is complementary in shape to a hex shaped top surface of the implant and they are held together by a tiny screw. When the implantologist secures the abutment to the implant, these surfaces must be perfectly aligned, otherwise the anti-rotation surfaces can be damaged and the abutment can be allowed to rotate.

Therefore, there is a need for an implant system having an easy to use anti-rotation abutment locking system that provides a positive indication to the implantologist that the abutment is securely locked to the implant.

SUMMARY OF THE INVENTION

The disadvantages of the prior art are overcome by the present invention which, in one aspect, a dental prosthesis securing system for securing a dental prosthesis to a dental implant. An abutment for cement has a base surface for placement against the dental implant. The base surface does not define an engagement shape that requires alignment with a complementary shape defined by the implant. A securing mechanism secures the abutment for cement to the dental implant.

In another aspect, the invention is a dental implant system, for implantation into a jawbone of a patient that includes a dental implant fixture. An internal locking collar extends upwardly from the dental implant fixture. The internal locking collar defines a central bore extending downwardly into the dental implant fixture. A first slot locking mechanism canal has a first portion, terminating in an end, that is parallel to the central bore and a second portion that extends transversely from the end of the first portion. An external collar is disposed around the internal locking collar so as to prevent intrusion by surrounding tissue of the patient into the central bore and the first slot locking mechanism canal. An abutment for cement includes a base surface defining a central hole that has a diameter greater than the central bore and includes a prosthesis attachment surface extending upwardly therefrom. A male locking mechanism includes at least one first tab extending outwardly therefrom. The male locking mechanism is configured to be pushed through the central hole and into the central bore so that the at least one first tab slides into the first slot locking mechanism canal. When the at least one first tab reaches the end of the first portion and rotational force is applied to the male locking mechanism, the tab will move into the second portion and lock into place, thereby securing the abutment to the dental implant fixture.

In yet another aspect, the invention is a dental implant system that includes a dental implant fixture. An internal locking collar extends upwardly from the dental implant fixture. The internal locking collar defines a central bore extending downwardly into the dental implant fixture. An abutment for cement includes a base surface defining a central hole aligned with the central bore and includes a prosthesis attachment surface extending upwardly therefrom. An expansion locking system is disposed through the central hole and within the bore. A portion of the expansion locking system is expanded outwardly so as to lock the abutment for cement to the dental implant fixture.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
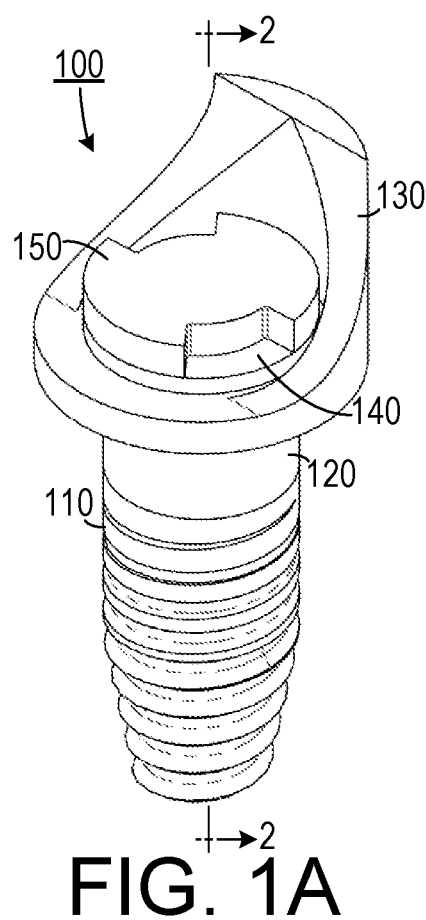
FIG. 1A is a perspective view of one embodiment of a dental implant system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1B:
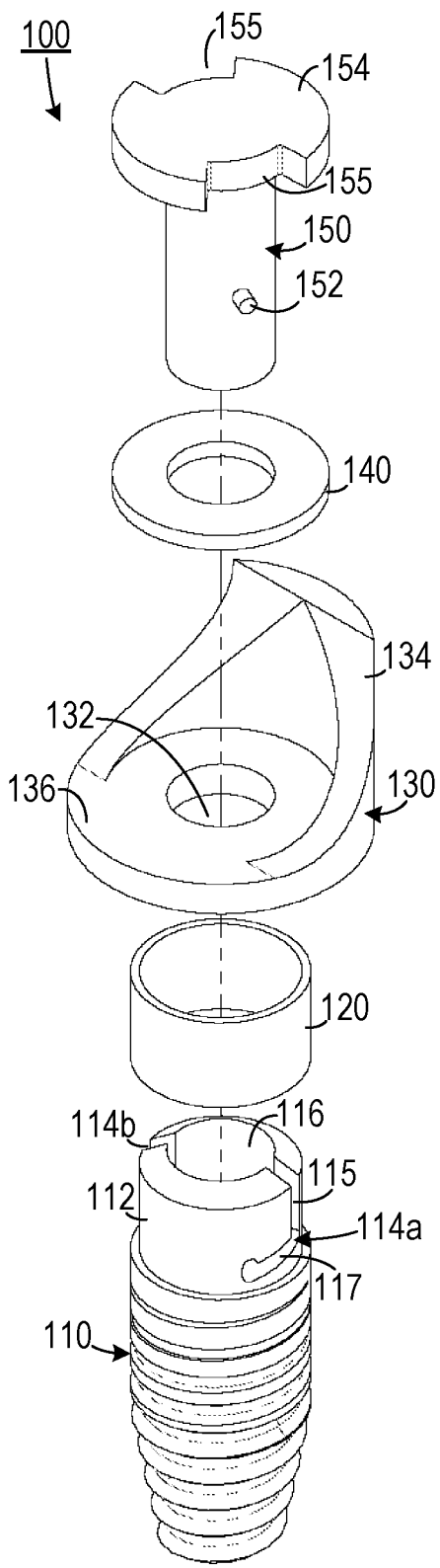
FIG. 1B is an exploded view of the embodiment shown in FIG. 1A.
Figure 2:
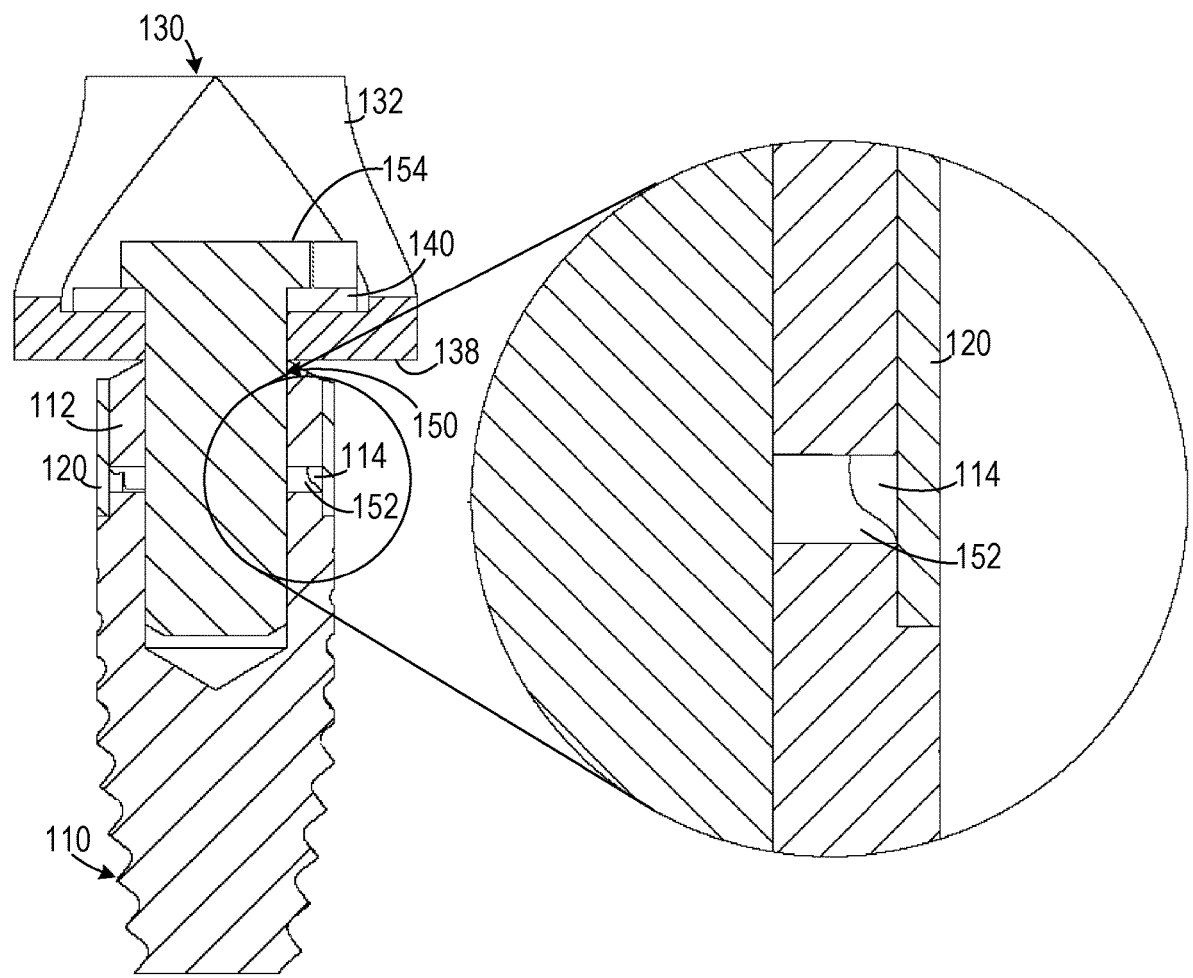
FIG. 2 is a cross-sectional view of the embodiment shown in FIG. 1A, taken along line 2-2.

As shown in FIGS. 1A, 1B and 2, one embodiment of a dental implant system 100 includes a dental implant fixture 110, which could include either a threaded type implant fixture or a cylinder type implant fixture, that is configured to be placed in a prepared cite in a patient's mandibular or maxillary bone. An internal locking collar 112 extends upwardly from the dental implant fixture 110 and defines a central bore 116 extending downwardly into the dental implant fixture 110. A first slot locking mechanism canal 114a is in communication with the central bore 116. The first slot locking mechanism canal 114a has a first portion 115, terminating in an end, that is parallel to the central bore 116 and a second portion 117 that extends transversely from the end of the first portion 115. A second slot locking mechanism canal 114b that is rotationally symmetric with the second slot locking mechanism canal 114a may also be employed. An external collar 120 is placed around the internal locking collar 112 to protect surrounding tissue once the implant system 100 is in place. The external collar 120 could be removable or it could be welded to the dental implant fixture 110. The external collar 120 can be a cylindrical ring having a height and shape that corresponds to that of the internal locking collar 112.

An abutment for cement 130 includes a flat surface 136 that defines a central hole 132 that has a diameter greater than the central bore 116 and includes a prosthesis attachment surface 134 extending upwardly therefrom. The abutment for cement 130 has a base surface 138 that does not define an engagement shape that requires alignment with a complementary shape defined by the implant. A washer 140 can fit onto the flat surface 136.

A male locking mechanism 150 includes at least one first tab 152 extending outwardly therefrom (in most applications, two oppositely disposed tabs 152 will be employed) and a top portion 154 that serves as a wrench engagement surface that defines two oppositely disposed notches 155 for engagement with a wrench-type tool (not shown).

Once the dental implant fixture 110 has been emplaced for a sufficient amount of time to ensure bone growth into the dental implant fixture 110, the abutment 130 is affixed to the dental implant fixture 110 using the male locking mechanism 150, which is pushed into the central bore 116 so that the tabs 152 slide into the slot locking mechanism canal 114 and then rotational force is applied to the wrench engagement surface top portion 154 with a wrench (not shown) until the tabs 152 lock into place. Once locked into place, the prosthesis may be cemented, or otherwise attached, to the abutment 130.

Figure 3A:
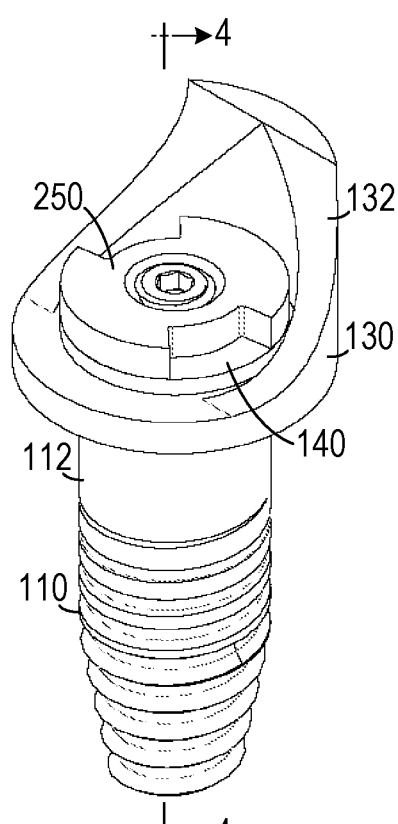
FIG. 3A is a perspective view of a second embodiment of a dental implant system.
Figure 3B:
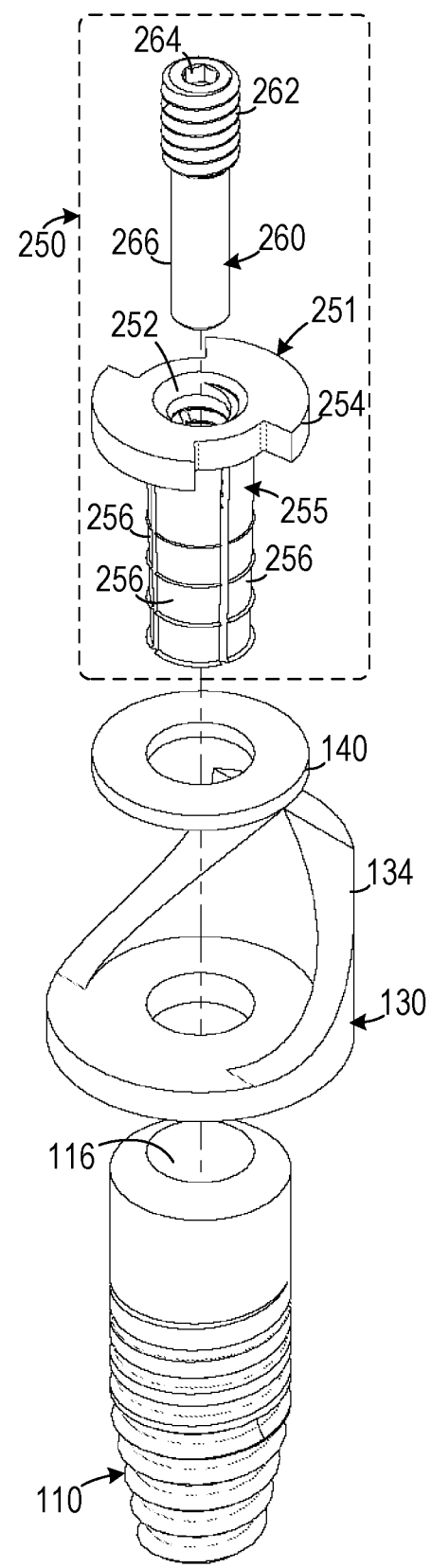
FIG. 3B is a n exploded view of the embodiment shown in FIG. 3A.
Figure 4:
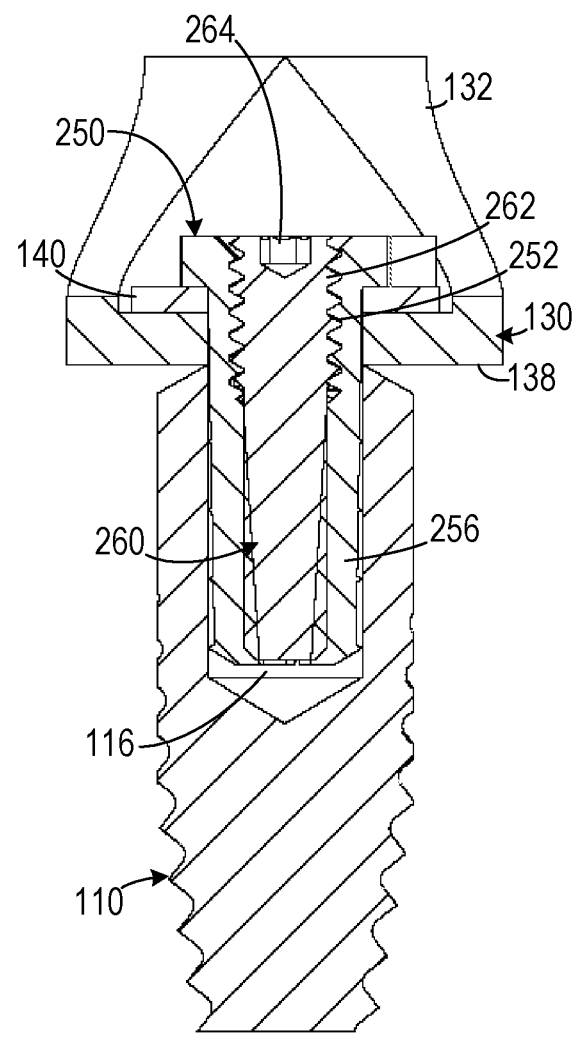
FIG. 4 is a cross-sectional view of the embodiment shown in FIG. 1A, taken along line 4-4.

In an alternate embodiment, as shown in FIGS. 3A, 3B and 4, the system employs an expansion locking system 250 to secure the abutment 130 to the implant 110. The expansion locking system 250 includes an expansion member 251 that includes manipulation surface 254 from which an expansion member 255 depends. The expansion member 255 includes at least two extendable expansion lock members 256 extend downwardly from the manipulation surface 254. The manipulation surface 254 defines a partially threaded bore 252 that extends into the laterally extendable expansion lock members 256.

A cylindrical expander 260 has a non-threaded lower rod portion 266 extending to a upper threaded portion 262 and ends by defining a wrench engagement surface 264. The wrench engagement surface 264 is complimentary in shape to a tool (not shown), such as a hex wrench, for screwing the cylindrical expander into the expansion member.

To secure the abutment 130 to the implant 110, the expansion locking system 250 is pushed through the abutment 130 into the central bore 116 the expander 260 is pushed into the partially threaded bore 252 and then screwed therein. This causes the expander to put outward force on the expansion lock members 256, forcing them to engage the inner surface of the central bore 116, thereby locking the abutment for cement to the dental implant fixture 110. This embodiment could be well suited for use with existing in situ implants when replacing a failed abutment.

The component parts (including the dental implant fixture and the male locking mechanism) of the dental implant systems disclosed above can be made of materials such as titanium, zirconia, a ceramic, stainless steel, a noble metal, or alloys that include combinations thereof.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A dental prosthesis securing system, comprising:
   (a) a dental implant fixture having a locking collar extending upwardly therefrom, the locking collar ending in a top surface, the dental implant fixture defining a central bore opening to the top surface, a slot locking canal defined along at least one side of the central bore, the slot locking canal including a first portion that is parallel to the central bore and terminating in a bottom second portion that is perpendicular to the central bore;
   (b) an abutment for cement having a base surface that has a flat bottom surface abuts directly against the top surface of the locking collar so that every portion of the abutment for cement is outside of the dental implant fixture, the base surface defining a central hole passing therethrough a prosthesis attachment surface extending upwardly from a first side of the base surface so that the central hole is only partially surrounded by the attachment surface so as to expose the central hole defined by the base surface through a second side of the base surface opposite from the first side; and
   (c) a securing mechanism that secures the abutment for cement to the dental implant fixture, the securing mechanism including:
      a top portion that includes a wrench engagement surface;
      (ii) a cylindrical member extending downwardly from the top portion;
      (iii) at least one tab extending outwardly from the cylindrical member, the cylindrical member passing through the central hole defined by the base surface and disposed in the central bore so that the at least one tab is disposed in the second portion so as to lock the abutment for cement against the top surface of the dental implant fixture.

2. The dental prosthesis securing system of claim 1, futher comprising an external collar disposed around the locking collar so as to prevent intrusion by surrounding tissue of the patient into the central bore and the first slot locking mechanism canal.

3. The dental prosthesis securing system of claim 1, further comprising:
   (a) at least one second tab extending outwardly from the cylindrical member opposite from the at least one first tab; and
   (b) a second slot locking mechanism canal having a first portion, terminating in an end, that is parallel to the central bore and a second portion that extends transversely from the end of the first portion, wherein the second tab engages the second slot locking mechanism.

4. A dental implant system, for implantation into a jawbone of a patient, comprising:
   (a) a dental implant fixture;
   (b) an internal locking collar extending upwardly from the dental implant fixture and terminating in a top surface, the internal locking collar defining a central bore extending downwardly from the top surface into the dental implant fixture, a first slot locking canal having a first portion, terminating in an end, that is parallel to the central bore and a second portion that extends transversely from the end of the first portion;
   (c) an external collar disposed around the internal locking collar so as to prevent intrusion by surrounding tissue of the patient into the central bore and the first slot locking mechanism canal;
   (d) an abutment for cement, including a base surface that has a flat bottom surface that abuts directly against the top surface of the locking collar so that every portion of the abutment for cement is outside of the dental implant fixture, defining a central hole that has a diameter greater than the central bore and including a prosthesis attachment surface extending upwardly therefrom, a prosthesis attachment surface extending upwardly from a first side of the base surface so that the central hole is only partially surrounded by the attachment surface so as to expose the central hole defined by the base surface through a second side of the base surface opposite from the first side; and
   (e) a male locking mechanism having a top portion that includes a wrench engagement surface, a cylindrical member extending downwardly from the top portion, and including at least one first tab extending outwardly therefrom, the male locking configured to be pushed through the central hole and into the central bore so that the at least one first tab slides into the first slot locking canal so that when the at least one first tab reaches the end of the first portion and rotational force is applied to the male locking mechanism, the tab will move into the second portion and lock into place, thereby securing the abutment to the dental implant fixture.

5. The dental implant system of claim 4, wherein the external collar is welded to the dental implant fixture.

6. The dental implant system of claim 4, wherein the external collar comprises a cylindrical ring having a height and shape that corresponds to the internal locking collar.

7. The dental implant system of claim 4, further comprising at least one second tab extending outwardly from the cylindrical member opposite from the at least one first tab.

8. The dental implant system of claim 7, further comprising a second slot locking mechanism canal having a first portion, terminating in an end, that is parallel to the central bore and a second portion that extends transversely from the end of the first portion, wherein the second tab engages the second slot locking mechanism.

9. The dental implant system of claim 4, further comprising a washer disposed between the top portion of the male locking mechanism and the base surface of the abutment for cement.

10. The dental implant system of claim 4, wherein the wrench engagement surface of the top portion of the male locking mechanism comprises a disk that defines two oppositely disposed notches for engagement with a tool.

11. The dental implant system of claim 4, wherein the dental implant fixture and the male locking mechanism comprise a material selected from a list of materials consisting of: titanium, zirconia, a ceramic, stainless steel, a noble metal, and combinations thereof.

\* \* \* \* \*